Figure 1:
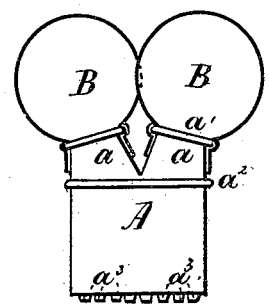

(No Model.)

W. E. H. SOMMER.
Confectioners' Forms and their Application.

No. 234,623. Patented Nov. 16, 1880.

Witnesses
H. A. Daniels
Wm. A. McElwee

Inventor
Wilhelm E. H. Sommer
by Henry Orth, Atty.

N. PETERS, PHOTO-LITHOGRAPHER, WASHINGTON, D C.

United States Patent Office.

WILHELM E. H. SOMMER, OF BERNBURG, GERMANY.

CONFECTIONERS' FORMS AND THEIR APPLICATION.

SPECIFICATION forming part of Letters Patent No. 234,623, dated November 16, 1880.

Application filed July 6, 1880. (No model.) Patented in Germany July 27, 1878, in Austria-Hungary March 4, 1879, in Belgium November 13, 1878, and in France November 16, 1878.

*To all whom it may concern:*

Be it known that I, WILHELM EMIL HERMANN SOMMER, a subject of the Duke of Anhalt, residing at the city of Bernburg, in the German Empire, have invented certain new and useful Improvements in Confectioners' Forms and their Application; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to a novel method and means for manufacturing certain classes of confectionery known as "chocolates," "fondants," "liqueurs," or "conserves," and for ornamenting the same or other articles of confectionery and pastry; and the invention consists, first, in forming upon a sheet or sheets of greased paper, in one or more colors, a matrix composed of a design or figure or designs or figures consisting of a series of points or dots or lines made of the usual cold icing and filling the interstices or open field between said dots or points with the desired sugar-compound, either chocolate, fondant, liqueur, or conserves; second, in the method of ornamenting confectionery or pastry by forming thereon at one operation a complete design or figure in one or more colors by means of atmospheric pressure and a mold or form; and, lastly, the invention consists in the novel construction of the devices employed for producing the matrix or ornamentation.

That class of confectionery technically known under the various names of "chocolates," "fondants," "liqueurs," or "conserves," &c., all prepared by boiling sugar with other ingredients to obtain a more or less fluid mass, flavored according to the denomination of the article or the taste of the manufacturer, are compounds which are well known to the trade, and from which articles of confectionery are made in the following manner:

By means of a pattern or hand-stamp having the form or configuration of the article to be produced an impression is made in a layer of rice, corn, or wheat starch contained in a shallow box, and which forms the matrix, the more or less fluid sugar-compound being poured in it while warm and allowed to cool and harden, when the article is removed, fixed, and ornamented.

Owing to the nature of the material of which the matrix is composed, the operation of molding results frequently in failure, entailing a loss of time and labor and involving considerable trouble, while even when successful the article is not always perfect, inasmuch as it acquires upon cooling a mealy or floury appearance. Nor is it possible to combine cold icing with these sugar-compounds, because the icing cannot be fixed into the matrix prior to the molding, and this combination can be effected only after the hardening of the article, its removal from the mold or matrix, and the careful elimination therefrom of any adhering starch, which invariably prevents the fixing of the icing when present upon the article.

The ornamentation of confectionery generally, as well as pastry, has been effected heretofore by means of the well-known paper cone, having a more or less fine discharge-aperture at the apex, through which the icing with which it is filled is forced by the application of pressure upon the edges of the wide end of the cone folded over the icing, as is well known, and which requires an operator of great skill and practice to produce symmetrical, clean, and tasty designs or figures. If the ornamentation by these means is to be in different-colored icing each color has to be applied separately, requiring a distinct operation, and usually more care than when one color is employed; and to avoid the above-described difficulties, save labor and time, and enable the most unskilled confectioner to produce designs or figures of the greatest regularity and symmetry and in different colors, is the object of my invention.

Figure 2:
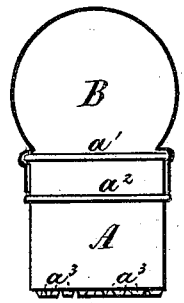
Figure 3:
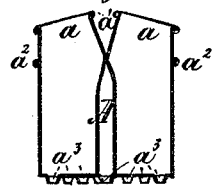
Figure 4:
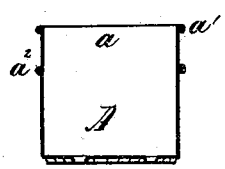
Figure 5:
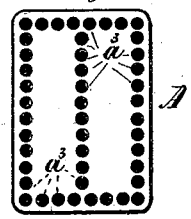
Figure 6:
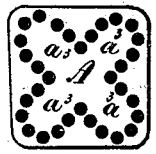
Figure 7:
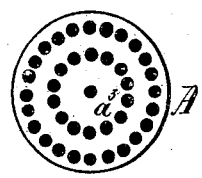
Figure 8:
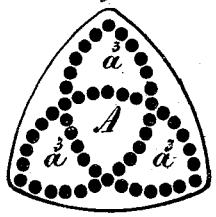
Figure 9:
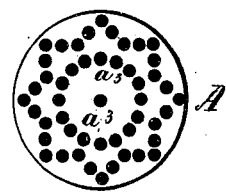

In the accompanying drawings, Figures 1 and 2 represent in elevation, Fig. 3 and 4 in vertical section, and Figs. 5 and 6 by bottom-plan views, the device for ornamenting confectionery and for producing matrices for such constructed according to my invention. Figs. 7, 8, and 9 show bottom-plan view of various geometrical figures or designs for the same.

A represents a metallic receiver, provided with beads $a'$ $a^2$ or flanges for the attachment of a compressible rubber bulb, B, said receiver being in general of the form of the article to be produced, either square, as shown in Figs. 2, 4, and 6, or oblong, as shown in Figs. 1, 3, and 5, or cylindrical, or of any other desired form. The bottom of the receiver has a series of discharge-apertures or truncated-cone discharge-spouts, $a^3$, projecting slightly beyond the face of said bottom, said apertures or discharge-ports being arranged to form any figure or design desired, some of these being illustrated by Figs. 5, 6, 7, 8, and 9, though it will be apparent that these may be varied *ad libitum et ad infinitum*.

In practice I construct the receiver of sheet-tin and the bottom of sheet-copper, preferably, though this is not imperative.

For producing party-colored ornaments or matrices I employ a receiver having a common bottom with a series of compartments, according to the number of colors desired in the design, which is then arranged with regard to the chambers or compartments according to the color given parts thereof are to have, and each compartment may be provided with a separate neck, $a$, for the reception of a compressible rubber bulb, B, as shown in Figs. 1, 3, and 5, so that when each compartment is filled with icing of a different color a party-colored matrix or ornamentation is produced thereby.

In the manufacture of the class of confectionery in which chocolate, fondant, liqueur, or conserve, or other like sugar-compound is to form the basis, I first form a matrix by means of the above-described device upon a sheet of greased, preferably oiled, or tracing paper by forcing the icing or party-colored icing through the bottom of the receiver, thus leaving or forming the figure or design by one pressure of the hand upon the bulb or bulbs in relief upon said paper, and consisting of a series of dots or points or lines, or a combination of these. These I allow to dry and harden, and then pour upon these, and so as to fill the intervals or open field between said points or dots with the desired sugar-compound, either chocolate, fondant, &c. The article so prepared is at the same time "fixed," as the confectioners term it, for ornamentation upon the reverse side, which may be effected, as soon as the article has hardened and cooled, by means of the same device or receiver, and may have the same figure or design or a different figure or design. I thus obtain a confection that has an obverse in mosaic work and a reverse in bas-relief ornamentation in neat colors, the icing being applied cold, which gives the article a beautiful appearance, as the body thereof (except in the case of chocolates, and even there to some extent) crystallizes upon cooling, and becomes more or less transparent and light-reflective. The rapidity with which these confections may be prepared and the time and labor that are saved will be readily apparent to all those conversant with this branch of manufacture, while failure in the result is almost an impossibility if the sugar-compound has been properly prepared, and the most unskilled confectioner can readily do the work which has heretofore been done by operators of experience and skill. So in the ornamentation of other confectionery or pastry, by one pressure of the hand a design is produced that required heretofore a hundred (more or less) of pressures of the thumb and hand, as well as skill and dexterity and taste.

I have illustrated in the drawings an apparatus by means of which the design is produced by a series of properly-disposed discharge-spouts having cylindrical discharge-ports; but it will be apparent that other forms may be given these ports, so as to produce squares, hexagons, &c., or lines, or even other than the geometrical figures shown; and I therefore do not desire to limit myself to the exact form or the arrangement of these discharge-orifices.

Having now described my invention, what I claim is—

1. The method of manufacturing confectionery by first preparing with a semi-fluid sugar-compound a matrix in relief upon paper, said matrix having open fields or spaces, then pouring the desired sugar-compound while warm into said spaces or open field and around the parts of the matrix, substantially as described.

2. The method of manufacturing and ornamenting confectionery by first preparing a matrix, as described, upon a sheet of paper, then pouring the desired sugar-compound in the open field or spaces and around the parts of the matrix, and finally applying ornaments in relief to the reverse face of the molded article, as and for the purposes set forth.

3. As a new article of manufacture, a confection having one face ornamented by inlaid or mosaic work and the other by ornaments in relief, as hereinbefore set forth.

4. A device for ornamenting confectionery or pastry, composed of a receiver having in its bottom discharge-ports arranged to form a design or figure, in combination with a compressible rubber bulb, substantially as and for the purpose specified.

5. A device for ornamenting confectionery or pastry, consisting of a receiver divided into two or more compartments or chambers and having in its bottom discharge-ports arranged to form a design, in combination with one or more rubber bulbs or other air-compressing device, as and for the purpose specified.

6. The method of ornamenting confectionery or pastry by projecting upon the article a figure or design by means of compressed air, substantially as set forth.

In testimony whereof I affix my signature in presence of two witnesses.

WILHELM EMIL HERMANN SOMMER.

Witnesses:
WILHELM MARKGRAF,
I. E. MONTGOMERY.